United States Patent
Ma et al.

(10) Patent No.: US 10,367,342 B2
(45) Date of Patent: Jul. 30, 2019

(54) DEAD END STRUCTURE FOR SUPPORTING A CABLE

(71) Applicant: Beijing PLP Conductor Line Products Co. Ltd., Beijing (CN)

(72) Inventors: Yue Ma, Beijing (CN); Wenji Wu, Beijing (CN); Xiaowei Sun, Beijing (CN); Qinghui Xie, Beijing (CN)

(73) Assignee: Beijing PLP Conductor Line Products Co. Ltd., Beijing (CN)

( * ) Notice: Subject to any disclaimer, the term of this patent is extended or adjusted under 35 U.S.C. 154(b) by 0 days.

(21) Appl. No.: 16/069,990

(22) PCT Filed: Jan. 13, 2017

(86) PCT No.: PCT/CN2017/071173
§ 371 (c)(1),
(2) Date: Jul. 13, 2018

(87) PCT Pub. No.: WO2017/121394
PCT Pub. Date: Jul. 20, 2017

(65) Prior Publication Data
US 2019/0081470 A1 Mar. 14, 2019

(30) Foreign Application Priority Data
Jan. 14, 2016 (CN) .......................... 2016 1 0022107

(51) Int. Cl.
*H02G 7/05* (2006.01)
*F16G 11/06* (2006.01)

(52) U.S. Cl.
CPC ............. *H02G 7/056* (2013.01); *F16G 11/06* (2013.01)

(58) Field of Classification Search
CPC ........ H02G 7/056; H02G 7/053; F16G 11/06; F16G 11/046; F16G 11/14; D07B 1/185; Y10T 24/3998; Y10T 24/3922
See application file for complete search history.

(56) References Cited

U.S. PATENT DOCUMENTS 3,134,842 A * 5/1964 Bethea, Jr. ............. H02G 7/056
174/79
3,299,626 A * 1/1967 Payer .................... H02G 7/056
174/173

(Continued)

FOREIGN PATENT DOCUMENTS

CN 2850084 Y 12/2006
CN 202602212 U 12/2012

(Continued)

OTHER PUBLICATIONS

Corresponding International Appl, Application No. PCT/CN2017/07113, Int. Search Report dated Apr. 26, 2017, 12 Pages.

*Primary Examiner* — Jack W Lavinder
(74) *Attorney, Agent, or Firm* — Cooper Legal Group, LLC

(57) ABSTRACT

A dead end structure for supporting a cable having a core portion includes a first support portion extending between a first end and a second end. A second support portion is attached to the first end of the first support portion. A third support portion is attached to the second end of the first support portion. A first helical winding and a second helical winding engage one another such that a first axial opening and a second axial opening are axially aligned to define an axial support opening into which the core portion of the cable is received. The second support portion and the third support portion apply a radial compressive force to the core portion. A sleeve defines an axial opening. The second (Continued)

support portion and the third support portion are received within the axial opening of the sleeve.

14 Claims, 12 Drawing Sheets

(56) References Cited

U.S. PATENT DOCUMENTS

| | | | | |
|---|---|---|---|---|
| 3,355,542 A * | 11/1967 | Finn | ............... | H02G 7/056 174/79 |
| 3,406,513 A * | 10/1968 | Butz | ............... | H01B 17/22 174/173 |
| 3,455,099 A * | 7/1969 | Butz | ............... | H02G 7/056 174/79 |
| 3,525,208 A * | 8/1970 | Reswick | ............... | F16G 11/03 57/212 |
| 3,618,308 A * | 11/1971 | Little | ............... | H02G 7/056 174/79 |
| 4,523,355 A * | 6/1985 | Rosa | ............... | H01B 17/06 24/115 N |
| 7,191,496 B2 | 3/2007 | Olenik et al. | | |
| 2004/0253857 A1 * | 12/2004 | Sakaguchi | ............... | H01R 4/20 439/134 |

FOREIGN PATENT DOCUMENTS

| | | |
|---|---|---|
| CN | 105680391 A | 6/2016 |
| JP | H04-138010 A | 5/1992 |

\* cited by examiner

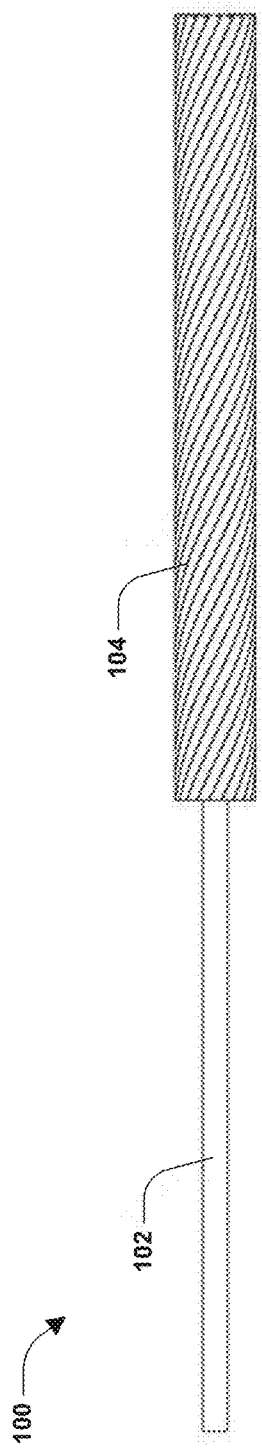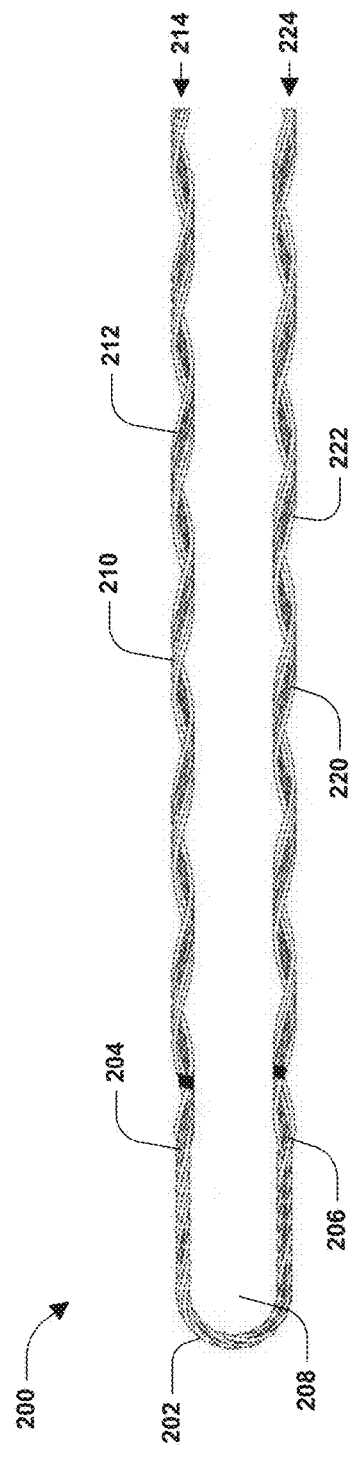

DEAD END STRUCTURE FOR SUPPORTING A CABLE

CROSS-REFERENCE TO RELATED APPLICATIONS

This application claims priority to both Chinese Patent Application CN105680391, CN201610022107.5 titled "A TYPE OF DEAD END CLAMP FOR COMPOSITE CORE REINFORCED CONDUCTOR" filed on Jan. 14, 2016 and PCT application PCT/CN2017/071173, WO2017121394 titled "DEAD END STRUCTURE FOR SUPPORTING A CABLE" filed on Jan. 13, 2017, and which are incorporated herein by reference.

TECHNICAL FIELD

The instant application is generally directed towards a dead end structure for supporting a cable. For example, the instant application is directed towards a dead end structure that supports a core portion of a cable.

BACKGROUND

Support devices, such as dead ends, can be used in an overhead power line environment to support a cable with respect to a tower, pole, or the like. The cable comprises an electrical conductive portion and an insulating portion.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a dead end structure for supporting a cable having a core portion comprises a first support portion extending between a first end and a second end. The first support portion defines a support opening through which the first support portion is configured to receive an attachment structure. A second support portion is attached to the first end of the first support portion. The second support portion has a first helical winding that defines a first axial opening. A third support portion is attached to the second end of the first support portion. The third support portion has a second helical winding that defines a second axial opening. The first helical winding and the second helical winding are configured to engage one another such that the first axial opening and the second axial opening are axially aligned to define an axial support opening into which the core portion of the cable is received. The second support portion and the third support portion are configured to apply a radial compressive force to the core portion to maintain a relative position between the core portion and the second support portion and the third support portion. A sleeve defines an axial opening that extends between a first sleeve end and a second sleeve end. The second support portion and the third support portion are received within the axial opening of the sleeve. The sleeve is configured to apply a radial compressive force to the second support portion and the third support portion to maintain a relative position between the second support portion and the third support portion.

In an example, a dead end structure for supporting a cable having a core portion comprises a first support portion extending between a first end and a second end. The first support portion defines a support opening through which the first support portion is configured to receive an attachment structure. A second support portion is attached to the first end of the first support portion. The second support portion has a first helical winding that defines a first axial opening. A third support portion is attached to the second end of the first support portion. The third support portion has a second helical winding that defines a second axial opening. The first helical winding and the second helical winding are configured to engage one another such that the first axial opening and the second axial opening are axially aligned to define an axial support opening into which the core portion of the cable is received. The second support portion and the third support portion are configured to apply a radial compressive force to the core portion to maintain a relative position between the core portion and the second support portion and the third support portion. A filler structure is disposed between an end of the core portion and the first support portion. The filler structure is configured to be received within the axial support opening. The second support portion and the third support portion are configured to apply a radial compressive force to the filler structure.

In an example, a dead end structure for supporting a cable having a core portion comprises a first support portion extending between a first end and a second end. The first support portion defines a support opening through which the first support portion is configured to receive an attachment structure. A second support portion is attached to the first end of the first support portion. The second support portion has a first helical winding that defines a first axial opening. A third support portion is attached to the second end of the first support portion. The third support portion has a second helical winding that defines a second axial opening. The first helical winding and the second helical winding are configured to engage one another such that the first axial opening and the second axial opening are axially aligned to define an axial support opening into which the core portion of the cable is received. The second support portion and the third support portion are configured to apply a radial compressive force to the core portion to maintain a relative position between the core portion and the second support portion and the third support portion. A cap defines a cap opening. The cap is configured to receive an end of the core portion within the cap opening to form a seal between the cap and the core portion. The cap is configured to be received within the axial support opening.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DESCRIPTION OF THE DRAWINGS

FIG. 1 illustrates an example cable comprising a core portion and a conductor portion;

FIG. 2 illustrates an example cable support structure;

DETAILED DESCRIPTION

Figure 3:
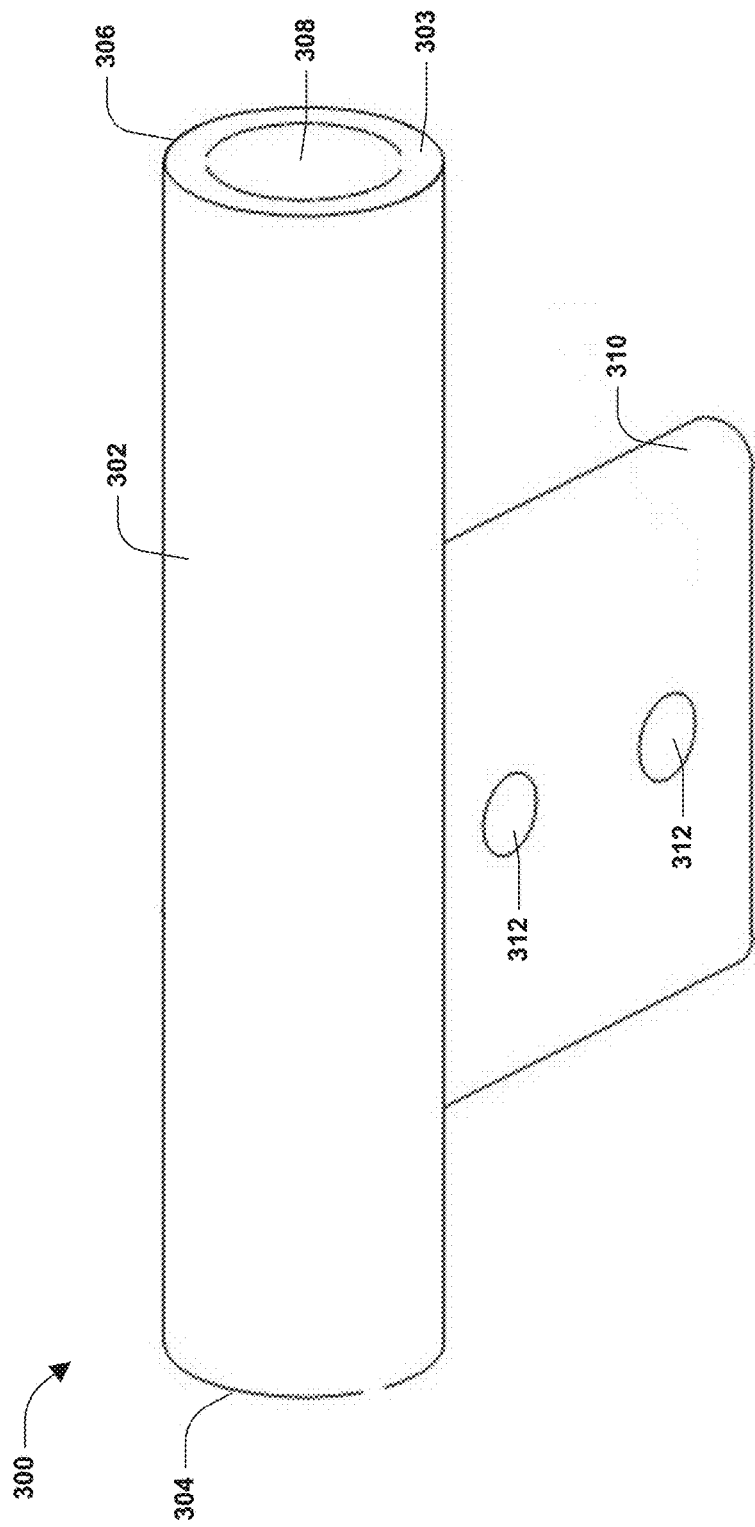
FIG. 3 illustrates an example sleeve.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

Turning to FIG. 1, a cable 100 that can be used as part of an overhead power line environment is illustrated. The overhead power line environment comprises any number of structures, configurations, constructions, etc., some of which may be described and/or illustrated with respect to FIGS. 1 to 12. In an example, the overhead power line environment can be used in association with electric power transmission and/or distribution. One or more conductors can be suspended by a tower, pole, or the like.

In some examples, the cable 100 is an electrically conductive cable (e.g., wire, power line, conductor, etc.) through which electrical energy (e.g., current) can be transmitted. In an example, a portion of the cable 100 may comprise a metal material that is electrically conductive, while a second portion of the cable 100 may comprise an electrically insulating material. In an example, the cable 100 can be supported at a distance above the ground (e.g., overhead).

The cable 100 comprises a core portion 102 and a conductor portion 104. In an example, the core portion 102 and the conductor portion 104 extend co-axially, with the conductor portion 104 circumferentially surrounding a portion of the core portion 102. The core portion 102 may comprise an electrically insulating material that is non-electrically conductive, such as a carbon fiber material and a glass material. The conductor portion 104 may comprise an electrically conductive material, such as a metal material (e.g., aluminum), for example. In an example, the conductor portion 104 may circumferentially surround some of the core portion 102 but not the entire core portion 102. That is, a length of the core portion 102 (e.g., on the left side) may not be surrounded by the conductor portion 104 while another length of the core portion 102 (e.g., on the right side) may be surrounded by the conductor portion 104.

Referring to FIG. 2, a cable support structure 200 is illustrated comprising a first support portion 202, a second support portion 210, and a third support portion 220. The cable support structure 200 may comprise one or more strands that, together, comprise the first support portion 202, the second support portion 210, and the third support portion 220. In an example, the strands may comprise a support member (e.g., a wire, a metal wire, etc.) that is circumferentially surrounded by a jacket (e.g., a non-conductive or semiconductor material). It will be appreciated that any number of strands (e.g., one or more) can be provided. The strands can have at least some degree of rigidity, stiffness, firmness, etc., such that the cable support structure 200 is resistant to inadvertent bending forces or the like.

In an example, the first support portion 202 can extend along a non-linear axis between a first end 204 and a second end 206. In an example, the first support portion 202 comprises a bend located between the first end 204 and the second end 206. Due to the bend and the non-linear shape, the first support portion 202 can have a U-shape. The first support portion 202 can define a support opening 208 through which the first support portion 202 is configured to receive an attachment structure. In an example, a portion of an attachment structure (e.g., illustrated in FIGS. 7 and 8) can extend partially and/or completely through the support opening 208. The attachment structure can grip, hold, wrap around, receive, and/or engage the first support portion 202. As such, the attachment structure can support the cable support structure 200.

The second support portion 210 is attached to the first end 204 of the first support portion 202. The second support portion 210 has a first helical winding 212 that defines a first axial opening 214. In an example, the second support portion 210 can extend along a second support axis, with the first helical winding 212 helically winding about the second support axis. The first helical winding 212 can define one or more spaces between neighboring helical winds.

The third support portion 220 is attached to the second end 206 of the first support portion 202. The third support portion 220 has a second helical winding 222 that defines a second axial opening 224. In an example, the third support portion 220 can extend along a third support axis, with the second helical winding 222 helically winding about the third support axis. The second helical winding 222 can define one or more spaces between neighboring helical winds.

In an example, the first helical winding 212 and the second helical winding 222 are configured to engage one another such that the first axial opening 214 and the second axial opening 224 may be axially aligned to define an axial support opening 230 (e.g., illustrated in FIG. 7) into which the core portion 102 of the cable 100 is received. By engaging each other, the first helical winding 212 can be received with the spaces defined within the second helical winding 222, while the second helical winding 222 can be received within the spaces defined within the first helical winding 212. The second support portion 210 and the third support portion 220 are configured to apply a radial compressive force to the core portion 102 to maintain a relative position between the core portion 102 and the second support portion 210 and the third support portion 220.

Referring to FIG. 3, a sleeve 300 for supporting a portion of the cable support structure 200 and the cable 100 is illustrated. In an example, the sleeve 300 can receive the core portion 102 and the conductor portion 104 of the cable 100, and the second support portion 210 and the third support portion 220 of the cable support structure 200.

The sleeve 300 comprises a sleeve portion 302 defining an axial opening 308 that extends between a first sleeve end 304 and a second sleeve end 306. In an example, the sleeve portion 302 is substantially hollow and extends linearly, such that the cable 100 can pass through the axial opening 308 of the sleeve portion 302. While the sleeve portion 302 may comprise any number of cross-sectional shapes, in the illustrated example, the sleeve portion 302 comprises a substantially circular cross-sectional shape. The second support portion 210 and the third support portion 220 can be received within the axial opening 308 of the sleeve 300. In an example, the sleeve 300 is configured to apply a radial compressive force to the second support portion 210 and the third support portion 220 to main a position of the second support portion 210 and the third support portion 220 relative to the sleeve 300. The sleeve 300 may comprise a relatively rigid material that is resistant to bending, flexing, and/or fracture. In an example, the sleeve 300 comprises a metal material, such as aluminum.

The sleeve 300 comprises an attachment portion 310 that is attached to the sleeve portion 302. In an example, the attachment portion 310 may be attached to an outer radial surface of the sleeve wall 303 and can extend away from the sleeve portion 302. The attachment portion 310 may be a substantially flat or planar structure that has a rectangular shape. The attachment portion 310 defines one or more attachment openings 312 that extend through. In an example, the attachment portion 310 extends along a plane that is parallel to an axis along which the sleeve portion 302 extends.

Figure 4:
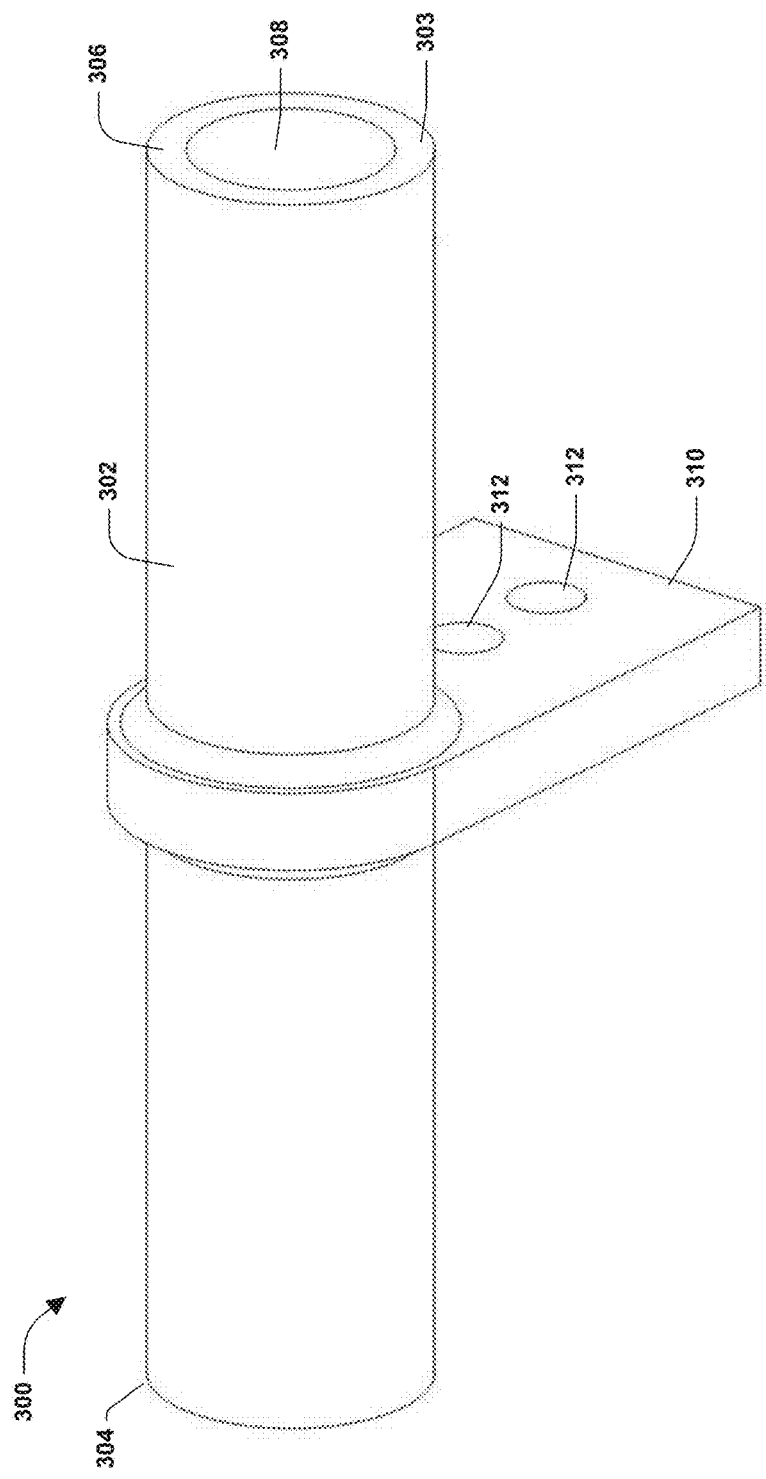
FIG. 4 illustrates an example sleeve.

Referring to FIG. 4, a second example sleeve 300 for supporting a portion of the cable support structure 200 and the cable 100 is illustrated. In an example, the sleeve 300 can receive the core portion 102 and the conductor portion 104 of the cable 100, and the second support portion 210 and the third support portion 220 of the cable support structure 200.

The sleeve 300 comprises the sleeve portion 302 defining the axial opening 308 that extends between the first sleeve end 304 and the second sleeve end 306. In an example, the sleeve portion 302 is substantially hollow and extends linearly, such that the cable 100 can pass through the axial opening 308 of the sleeve portion 302. While the sleeve portion 302 may comprise any number of cross-sectional shapes, in the illustrated example, the sleeve portion 302 comprises a substantially circular cross-sectional shape. The second support portion 210 and the third support portion 220 can be received within the axial opening 308 of the sleeve 300. In an example, the sleeve 300 is configured to apply a radial compressive force to the second support portion 210 and the third support portion 220 to main a position of the second support portion 210 and the third support portion 220 relative to the sleeve 300. The sleeve 300 may comprise a relatively rigid material that is resistant to bending, flexing, and/or fracture. In an example, the sleeve 300 comprises a metal material, such as aluminum.

The sleeve 300 comprises the attachment portion 310 that is attached to the sleeve portion 302. In an example, the attachment portion 310 may be attached to the outer radial surface of the sleeve wall 303 and can extend away from the sleeve portion 302. The attachment portion 310 may be a substantially flat or planar structure that has a rectangular shape. The attachment portion 310 defines one or more attachment openings 312 that extend through. In an example, the attachment portion 310 extends along a plane that is perpendicular to an axis along which the sleeve portion 302 extends. In this way, the attachment portion 310 of FIG. 4 can extend perpendicular to the attachment portion 310 of FIG. 3.

Figure 5:
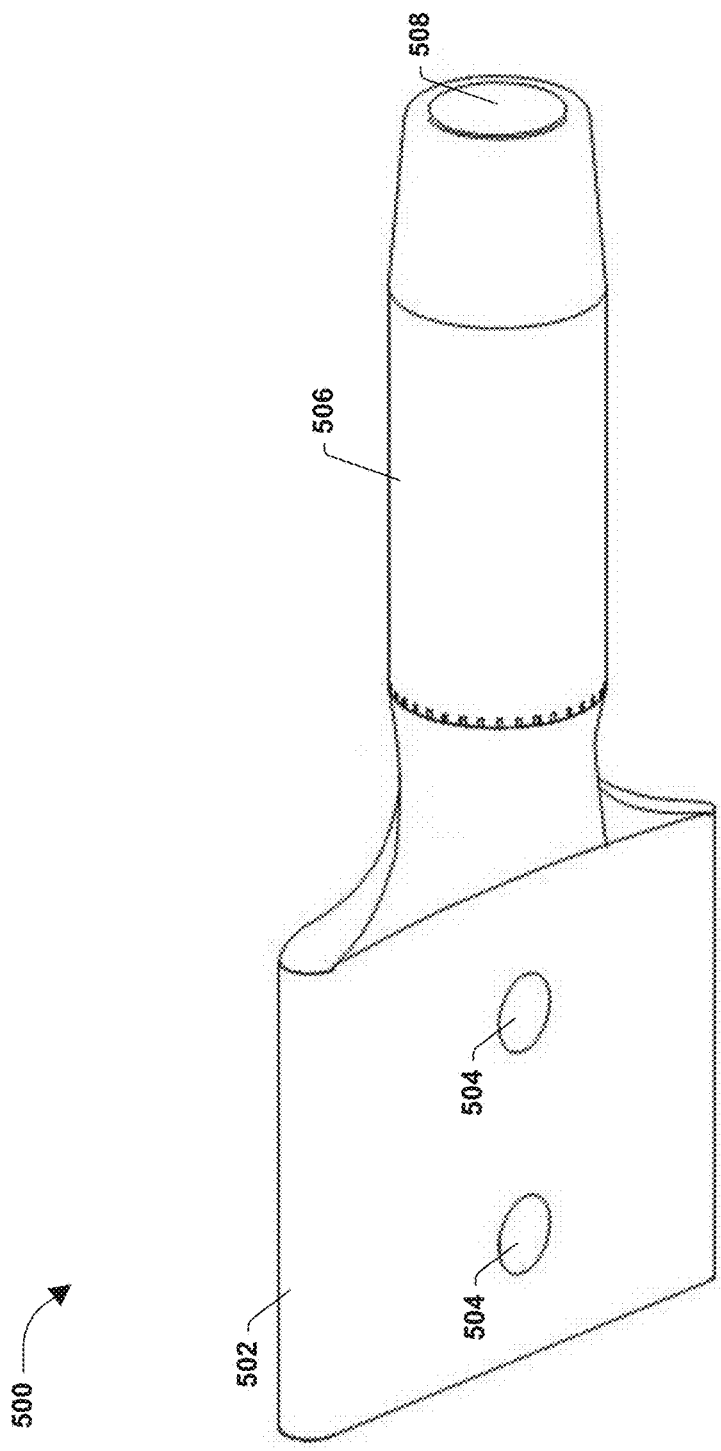
FIG. 5 illustrates an example connection structure.

Referring to FIG. 5, a connection structure 500 is illustrated. The connection structure 500 can be removably attached to the attachment portion 310 of the sleeve 300. In an example, the connection structure 500 comprises a second attachment portion 502. The second attachment portion 502 may be a substantially flat or planar structure that has a rectangular shape. The second attachment portion 502 defines one or more attachment openings 504 that extend through. In an example, the second attachment portion 502 can be positioned adjacent to or in contact with the attachment portion 310 of the sleeve 300 (e.g., illustrated in FIGS. 3 and 4). The attachment openings 504 of the second attachment portion 502 can be aligned with the attachment openings 312 of the attachment portion 310. In this way, the attachment portion 310 and the second attachment portion 502 can receive one or more fasteners (e.g., screws, bolts, etc.) through the attachment openings 312 and the attachment openings 504. In this way, the fasteners can function to attach the second attachment portion 502 of the connection structure 500 to the attachment portion 310 of the sleeve 300.

The connection structure 500 comprises an extension portion 506 that is attached to the second attachment portion 502. In an example, the extension portion 506 can be attached to and extend from a side of the second attachment portion 502. The extension portion 506 can define an extension opening 508 that extends at least partially through the extension portion 506.

Figure 6:
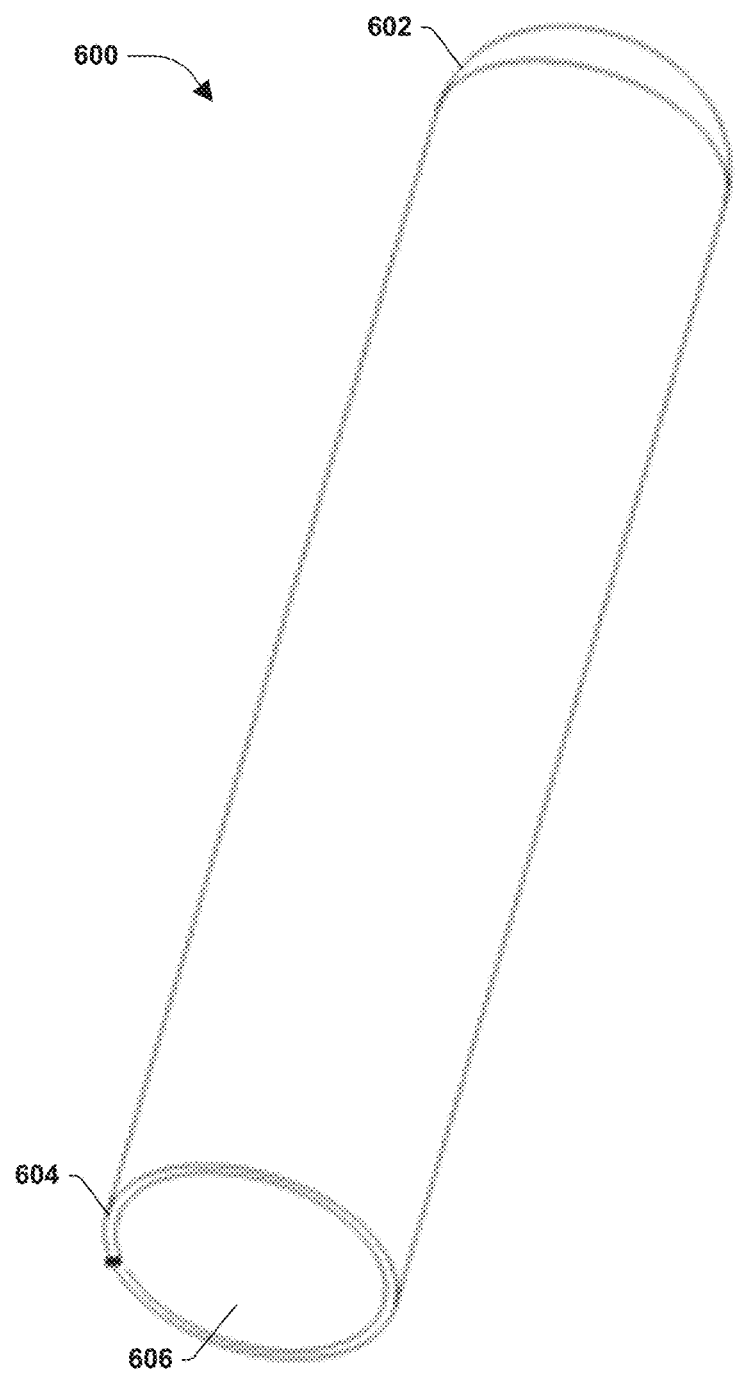
FIG. 6 illustrates an example cap for receiving a core portion of a cable.

Referring to FIG. 6, a cap 600 is illustrated. The cap 600 can extend substantially linearly between a first end 602 and a second end 604. In an example, the cap 600 defines a cap opening 606 at the second end 604. The cap opening 606 can extend partially along a length of the cap 600. In this way, the first end 602 of the cap 600 is closed, sealed, and or contained with a wall, while the second end 604 defines the cap opening 606. In an example, the cap 600 is configured to receive an end of the core portion 102 within the cap opening 606 to form a seal between the cap 600 and the core portion 102. The cap 600 is configured to be received within the axial support opening 230 of the second support portion 210 and the third support portion 220. In an example, the cap 600 comprises a metal material (e.g., steel, aluminum, etc.) or a relatively rigid non-metal material.

Figure 7:
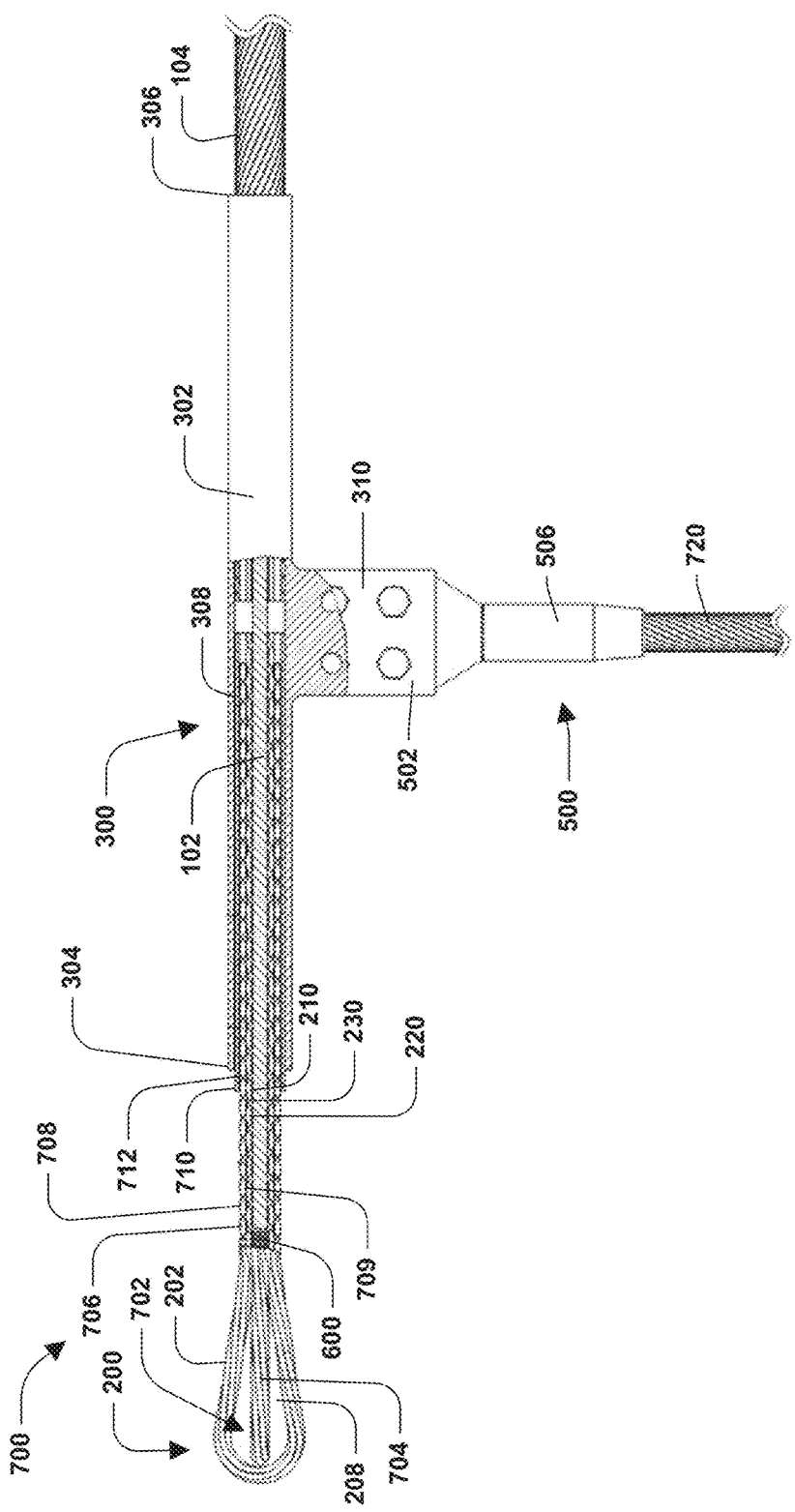
FIG. 7 illustrates a sectional view of an example dead end structure for supporting a cable.

Referring to FIG. 7, a sectional view of an example dead end structure 700 for supporting the cable 100 having the core portion 102 is illustrated. In an example, the cable 100, comprising the core portion 102 and the conductor portion 104, can be received within the axial opening 308 of the sleeve portion 302 of the sleeve 300.

In an example, the cap 600 can receive an end of the core portion 102 within the cap opening 606. In an example, an elastomeric sealing structure (e.g., an O-ring) can be positioned in contact with and radially between the cap 600 (e.g., at an outer radial location) and the core portion 102 (e.g., at an inner radial location). In this way, when the cap 600 receives the end of the core portion 102, the cap 600 and the O-ring can function to limit moisture from contacting an interior of the core portion 102.

The core portion 102 can be received within the axial support opening 230 of the cable support structure 200. For example, the first helical winding 212 of the second support portion 210 and the second helical winding 222 of the third support portion 220 are configured to engage one another such that the first axial opening 214 and the second axial opening 224 are axially aligned to define the axial support opening 230 into which the core portion 102 of the cable 100 is received. In an example, the second support portion 210 and the third support portion 220 can apply a radial compressive force to the core portion 102. In this way, a relative position is maintained between the core portion 102 and the second support portion 210 and the third support portion 220.

The dead end structure 700 comprises a second example cable support structure 702. In an example, the cable support structure 702 may be substantially identical to the cable support structure 200. For example, the cable support structure 702 comprises a first support portion 704, a second support portion 706, and a third support portion 708. The cable support structure 702 may comprise one or more strands that, together, comprise the first support portion 704, the second support portion 706, and the third support portion 708. In an example, the strands may comprise a support member (e.g., a wire, a metal wire, etc.) that is circumferentially surrounded by a jacket (e.g., a non-conductive or semiconductor material). It will be appreciated that any number of strands (e.g., one or more) can be provided. The strands can have at least some degree of rigidity, stiffness, firmness, etc., such that the cable support structure 702 is resistant to inadvertent bending forces or the like.

In an example, the first support portion 704 can extend along a non-linear axis between a first end and a second end. In an example, the first support portion 704 comprises a bend located between the first end and the second end. Due to the bend and the non-linear shape, the first support portion 704 can have a U-shape. The first support portion 704 can define a support opening through which the first support portion 704 is configured to receive an attachment structure. In an example, a portion of an attachment structure can extend partially and/or completely through the support opening. The attachment structure can grip, hold, wrap around, receive, and/or engage the first support portion 704. As such, the attachment structure can support the dead end structure 700.

The second support portion 706 is attached to the first end of the first support portion 704. The second support portion 706 has a first helical winding that defines a first axial opening. In an example, the second support portion 706 can extend along a second support axis, with the first helical winding helically winding about the second support axis. The first helical winding can define one or more spaces between neighboring helical winds.

The third support portion 708 is attached to the second end of the first support portion 704. The third support portion 708 has a second helical winding that defines a second axial opening. In an example, the third support portion 708 can extend along a third support axis, with the second helical winding helically winding about the third support axis. The second helical winding can define one or more spaces between neighboring helical winds.

In an example, the first helical winding and the second helical winding are configured to engage one another such that the first axial opening and the second axial opening may be axially aligned to define an axial support opening 709 into which the second support portion 210 and the third support portion 220 of the cable support structure 200 are received. By engaging each other, the first helical winding can be received within the spaces defined by the second helical winding, while the second helical winding can be received within the spaces defined within the first helical winding. The second support portion 706 and the third support portion 708 of the cable support structure 702 are configured to apply a radial compressive force to the second support portion 210 and the third support portion 220 of the cable support structure 200. In this way, a relative position can be maintained between the second support portion 706 and the third support portion 708 of the cable support structure 702 and the second support portion 210 and the third support portion 220 of the cable support structure 200.

In an example, the dead end structure 700 comprises a filling structure 710. The filling structure 710 can extend substantially co-axially with the cable 100, including the core portion 102 and the conductor portion 104, with the second support portion 210 and the third support portion 220 of the cable support structure 200, the second support portion 706 and the third support portion 708 of the cable support structure 702, and the sleeve portion 302 of the sleeve 300. In an example, the filling structure 710 has a substantially cylindrical cross-sectional shape and extends between a first end and a second end. In an example, the filling structure 710 comprises one or more rods that are helically wound about the second support portion 210 and the third support portion 220. The rods of the filling structure 710 may comprise, for example, a metal material such as aluminum.

The filling structure 710 may be substantially hollow and can define a filling structure opening 712. In an example, the filling structure 710 is configured to receive the second support portion 706 and the third support portion 708 of the cable support structure 702 within the filling structure opening 712. The filling structure 710 can extend circumferentially around the second support portion 706 and the third support portion 708 so as to surround the second support portion 706 and the third support portion 708, the second support portion 210 and the third support portion 220, and the core portion 102 of the cable 100. In an example, the filling structure 710 end can be located a distance away from the first support portion 202 and the first support portion 704 so as to define a gap, a space, etc. therebetween.

The filling structure 710 may be received within the axial opening 308 of the sleeve portion 302 so as to be surrounded by the sleeve portion 302. In an example, an inner radial side and/or an outer radial side of the filling structure 710 may comprise a material that can increase friction. For example, the inner radial side and the outer radial side of the filling structure 710 may be coated with a grit material. As such, friction can be increased between the filling structure 710 and the second support portion 706 and the third support portion 708 on the inner radial side of the filling structure 710. Likewise, friction can be increased between the filling structure 710 and an inner surface of the sleeve wall 303 of the sleeve portion 302. In this way, a relative position between the filling structure 710 and the second support portion 706 and the third support portion 708 on the inner radial side of the filling structure 710 is maintained. Similarly, a relative position between the filling structure 710 and the sleeve portion 302 is also maintained.

In an example, the sleeve portion 302 of the sleeve 300 can receive the filling structure 710. The filling structure 710 can receive the second support portion 706 and the third support portion 708 of the cable support structure 702. The second support portion 706 and the third support portion 708 of the cable support structure 702 can receive the second support portion 210 and the third support portion 220 of the cable support structure 200. The second support portion 210 and the third support portion 220 can receive the core portion 102 of the cable 100 and the cap 600.

In an example, a jumper line 720 can be received within the extension opening 508 of the extension portion 506 of the connection structure 500. The connection structure 500 can be attached to the attachment portion 310 of the sleeve 300. In this way, the jumper line 720 can function to support the cable 100.

Figure 8:
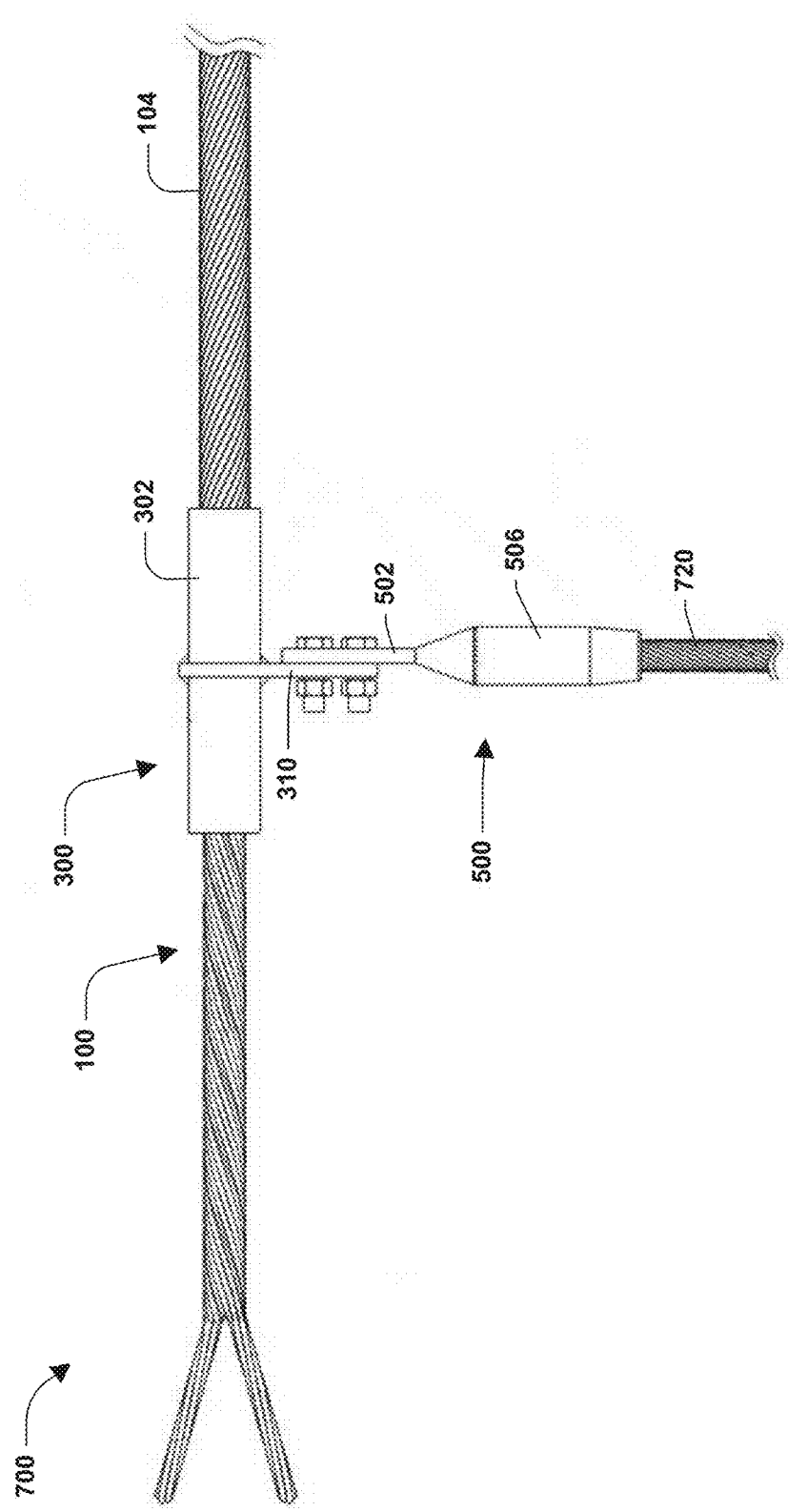
FIG. 8 illustrates a side view of an example dead end structure for supporting a cable.

Referring to FIG. 8, the dead end structure 700 is illustrated supporting the cable 100. While FIG. 7 illustrates the attachment portion 310 of FIG. 3, FIG. 8 illustrates the attachment portion 310 of FIG. 4. In an example, the attachment portion 310 can extend along a plane that is substantially perpendicular to a direction along which the cable 100 extends.

Figure 9:
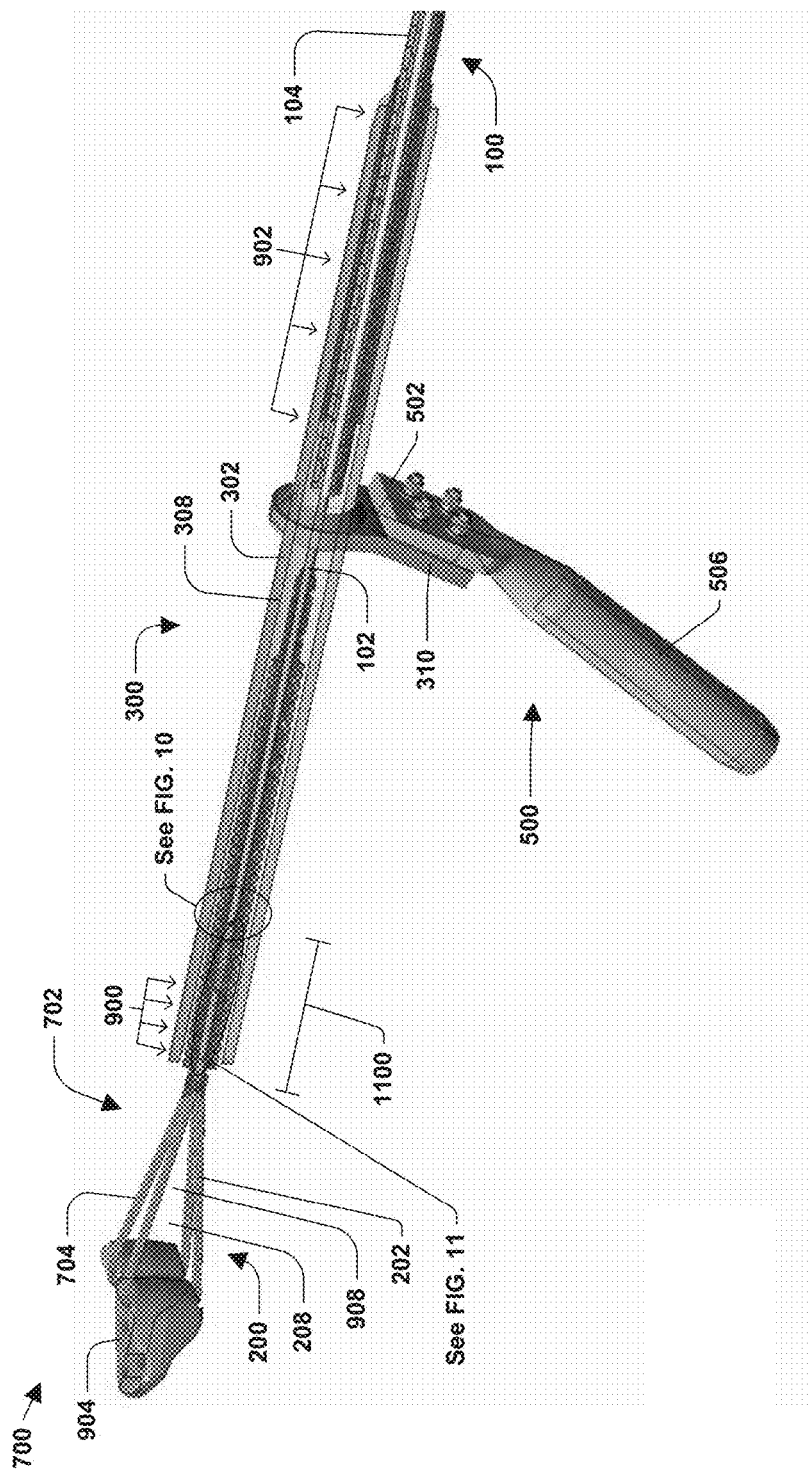
FIG. 9 illustrates a sectional view of an example dead end structure for supporting a cable.

Referring to FIG. 9, a sectional view of an example embodiment of the dead end structure 700 for supporting the cable 100 having the core portion 102 is illustrated. As with the examples of FIGS. 7 and 8, the dead end structure 700 comprises the cable 100, which comprises the core portion 102 and the conductor portion 104, the cap 600, the cable support structures 200, 702, the filling structure 710, and the sleeve 300 comprising the sleeve portion 302 and the attachment portion 310.

In an example, a compressive force can be applied to the sleeve portion 302 of the sleeve 300. For example, a compressive force can be applied to the sleeve portion 302 at a first force location 900 and a compressive force can be applied to the sleeve portion 302 at a second force location 902. In an example, the first force location 900 may be located at an end of the sleeve portion 302 near the first support portions 202, 704, while the second force location 902 may be located at an opposing end of the sleeve portion 302. Prior to compression, the sleeve portion 302 can have a substantially circular cross-sectional size between opposing ends of the sleeve portion 302. After compression, the sleeve portion 302 can have a non-circular cross-sectional shape at the first force location 900 and the second force location 902, such as a hexagonal cross-sectional shape, for example.

In an example, the compressive forces can cause the sleeve portion 302 to compress, crimp, or otherwise reduce in cross-sectional size. In this way, the compressive forces can cause the sleeve portion 302 at the first force location 900 and the second force location 902 to compress and grip the filling structure 710, thus maintaining a relative position between the sleeve portion 302 and the filling structure 710. In an example, a compressive force may not be applied at a location between the first force location 900 and the second force location 902 so as to protect the core portion 102 and reduce the likelihood of damage to the core portion 102.

The dead end structure 700 comprises an attachment structure 904. In an example, the first support portion 202 defines the support opening 208 through which the first support portion 202 is configured to receive an attachment structure 904. Likewise, in an example, the first support portion 704 defines a support opening 908 through which the first support portion 704 is configured to receive the attachment structure 904. In an example, a portion of the attachment structure 904 can extend partially and/or completely through the support opening 208 and/or the support opening 908. The attachment structure 904 can grip, hold, wrap around, receive, and/or engage the first support portion 202 and the first support portion 704. As such, the attachment structure 904 can support the cable support structure 200 and the cable support structure 702. In an example, the attachment structure 904 comprises a double thimble yoke plate with one or more openings that receive the first support portions 202, 704 so as to balance the load exerted.

Figure 10:
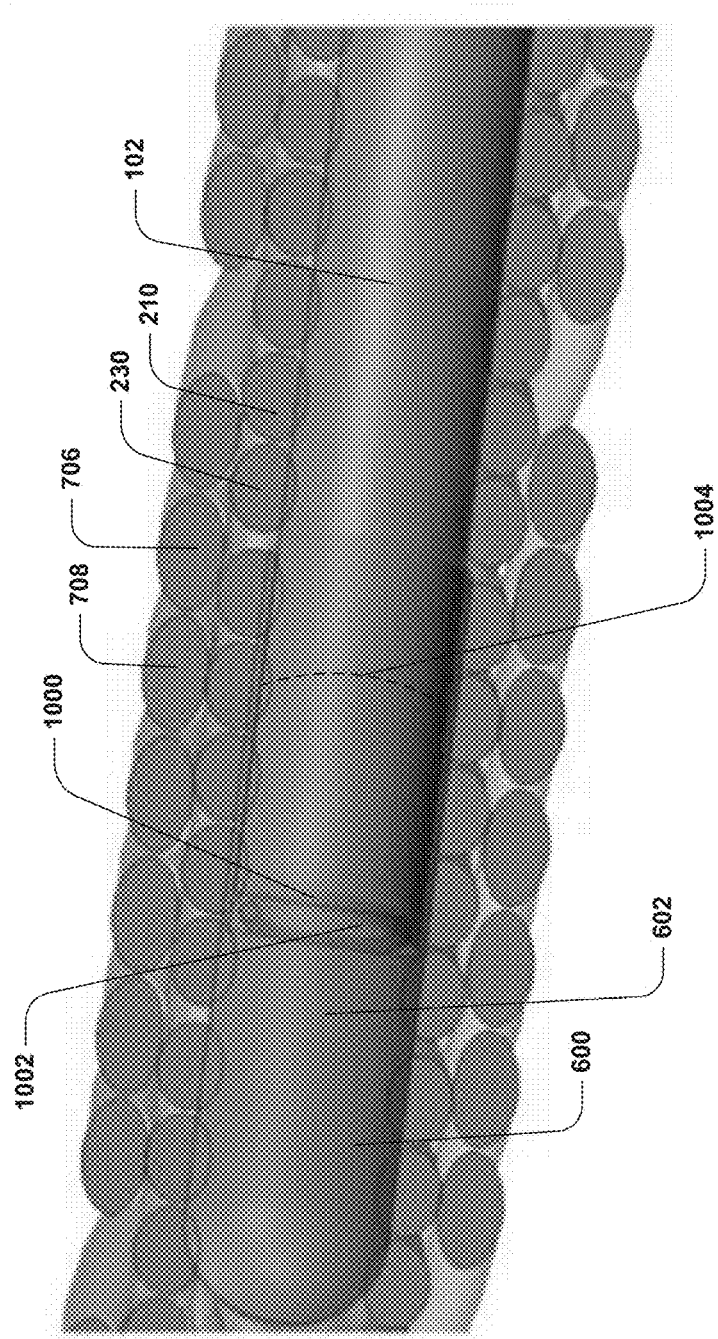
FIG. 10 illustrates a sectional view of an end of the core portion.

FIG. 10 illustrates a portion of the dead end structure 700 of FIG. 9. In an example, the cap 600 can receive an end 1000 of the core portion 102 within the cap opening 606. In an example, the core portion 102 can be at least partially hollow so as to define a hollow bore 1002 at the end 1000. The cap 600, by receiving the end 1000 of the core portion 102 and covering the core portion 102, can limit the ingress of moisture or other unwanted materials into the hollow bore 1002 of the core portion 102.

In an example, to further reduce an ingress of moisture, an elastomeric sealing structure 1004 (e.g., an O-ring, illustrated with dashed lines in FIG. 10 as the O-ring would normally be obstructed from view by the cap 600) can be positioned in contact with and radially between the cap 600 (e.g., at an outer radial location) and the core portion 102 (e.g., at an inner radial location). In this way, when the cap 600 receives the end of the core portion 102, the cap 600 and the sealing structure 1004 can form a seal with the core portion 102 to limit moisture from contacting an interior of the core portion 102. In an example, in addition to or in the alternative of using the sealing structure 1004, the cap 600 can be fixed to the core portion 102 with an adhesive.

Figure 11:
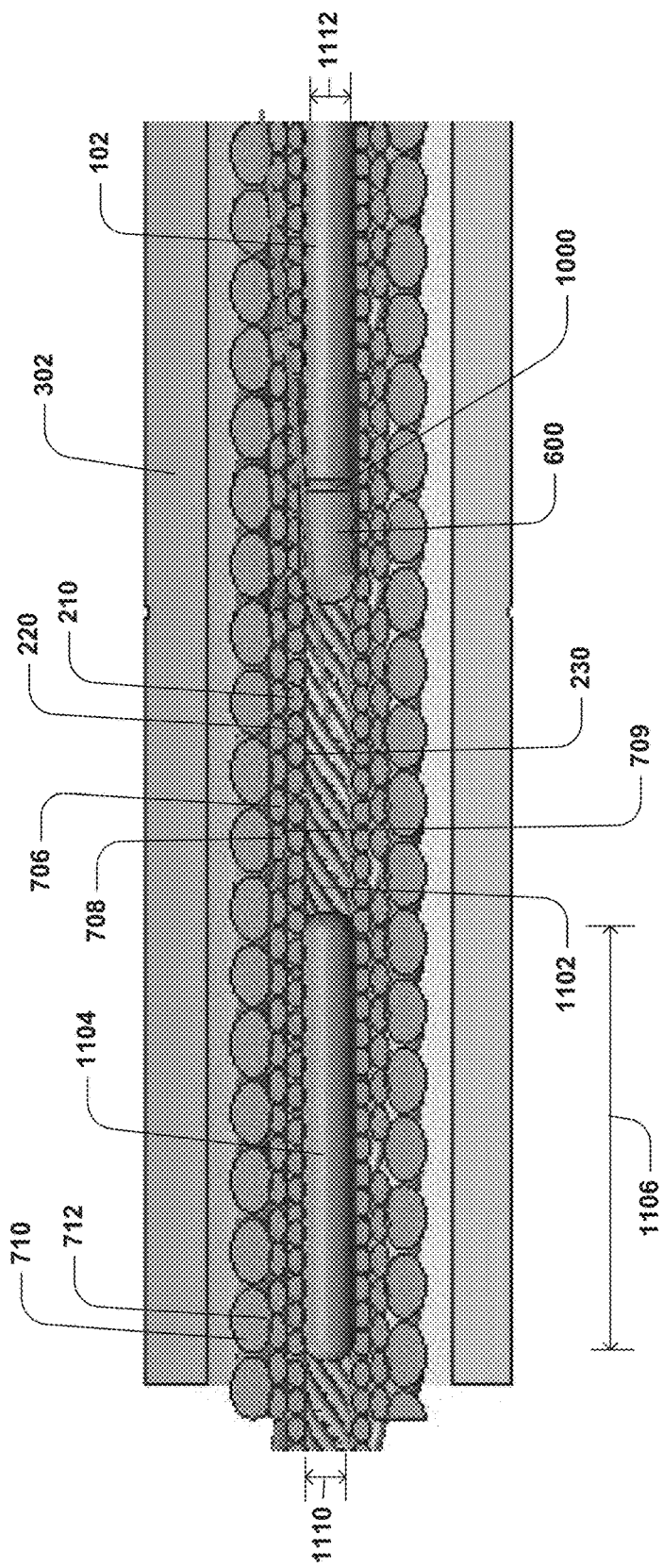
FIG. 11 illustrates a sectional view of a portion of an example dead end structure.

FIG. 11 illustrates a portion of the dead end structure 700 of FIG. 9. In an example, the end 1000 of the core portion 102 can be spaced a distance 1100 (e.g., illustrated in FIG. 9) apart from the first support portion 202 and the first support portion 704, and from the end of the sleeve portion 302 that is adjacent to the first support portion 202 and the first support portion 704. In this way, the core portion 102 can define a space 1102 that extends axially between the end 1000 of the core portion 102 and the first support portion 202 and the first support portion 704. The space 1102 may be circumferentially surrounded or bordered by the second support portion 210 and the third support portion 220. The core portion 102 may be spaced apart due, in part, to the core portion 102 being sensitive to radial compressive forces that may be more prevalent closer to the first support portion 202 and the first support portion 704. Accordingly, to shield the core portion 102 from some of the stresses present closer to the first support portion 202 and the first support portion 704, the end 1000 of the core portion 102 may be spaced the distance 1100 apart from the end.

In an example, the dead end structure 700 comprises a filler structure 1104 disposed between the end 1000 of the core portion 102 and the first support portion 202, 704. The filler structure 1104 can have a filler cross-sectional size 1110 that substantially matches a core cross-sectional size 1112 of the core portion 102. The filler structure 1104 can be received within the axial support opening 230. In an example, the second support portion 210 and the third support portion 220 are configured to apply a radial compressive force to the filler structure 1104. The filler structure 1104 can have a filler length 1106 that is less than the distance 1100 between the end 1000 of the core portion 102 and the first support portion 202 and the first support portion 704. In an example, the filler structure 1104 can be spaced a distance away from the core portion 102, such that the filler structure 1104 and the core portion 102 are not in contact.

The filler structure 1104 can comprise a substantially rigid and/or inflexible material that is resistant to unintended bending, compression, etc. For example, the filler structure 1104 may comprise a metal material, such as aluminum. In an example, due to the substantially matching cross-sectional sizes and shapes of the filler structure 1104 and the core portion 102, the filler structure 1104 can reduce over compression of the second support portion 210 and the third support portion 220 onto the core portion 102. For example, the filler structure 1104 can be positioned in proximity to the core portion 102, such that when the second support portion 210 and the third support portion 220 are radially compressed, the filler structure 1104 can resist radially inward deformation and/or deflection and/or compression of the second support portion 210 and the third support portion 220. As such, the second support portion 210 and the third support portion 220 are limited to compressing a certain degree (e.g., with the compression area defined by the filler cross-sectional size 1110). As such, the filler structure 1104 can limit over-compression of the second support portion 210 and the third support portion 220 which may, without the presence of the filler structure 1104, cause inadvertent damage to the core portion 102.

Figure 12:
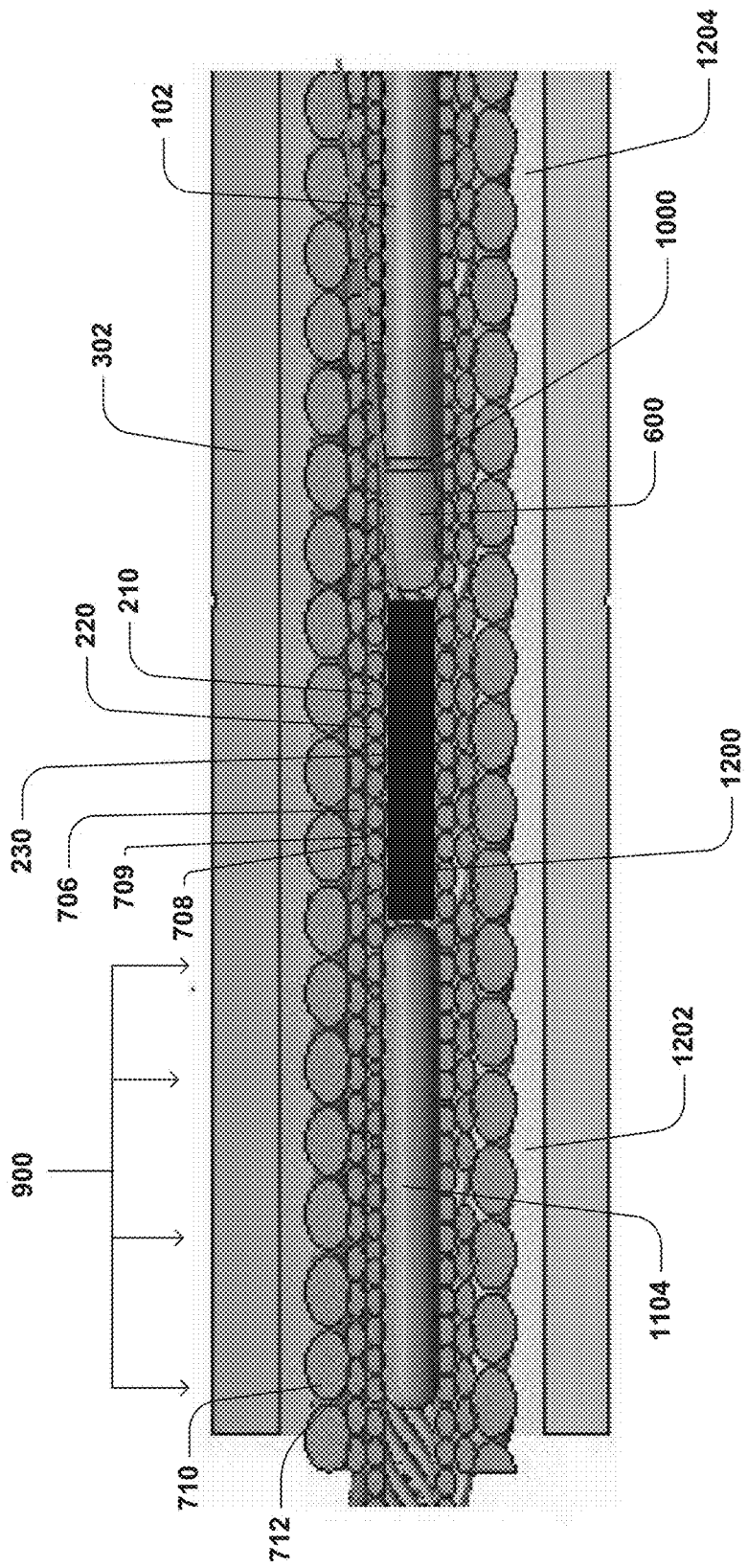
FIG. 12 illustrates a sectional view of a portion of an example dead end structure.

Referring to FIG. 12, in an example, the dead end structure 700 comprises a spacer structure 1200. The spacer structure 1200 can be positioned between the filler structure 1104 on one side and the core portion 102 on an opposing side. In this way, the spacer structure 1200 can be positioned within the axial support opening 230 such that the core portion 102, the filler structure 1104, and the spacer structure 1200 can extend substantially co-axially. The spacer structure 1200 can function to maintain a separating distance between the filler structure 1104 and the core portion 102. By maintaining this separating distance, the spacer structure 1200 can limit inadvertent contact between the filler structure 1104 and the core portion 102 while allowing for a proper amount of radial compression by the second support portion 210 and the third support portion 220 to occur. In an example, the spacer structure 1200 comprises a flexible, elastomeric material such as rubber, though any number of flexible or compressible materials are envisioned. By comprising the flexible, compressible elastomeric material, the spacer structure 1200 can allow for the second support portion 210 and the third support portion 220 to radially compress at least partially into the spacer structure 1200, thus causing the spacer structure 1200 to compress.

In an example, prior to radial compression of the sleeve portion 302, a first gap 1202 may be defined between the filling structure 710 and the sleeve portion 302 at a first location that corresponds with the filler structure 1104. In addition, a second gap 1204 may be defined between the filling structure 710 and the sleeve portion 302 at a second location that corresponds with the core portion 102. In an example, after the compressive force is applied to the sleeve portion 302 at the first force location 900, the first gap 1202 may be eliminated due to the sleeve portion 302 radially compressing onto the filling structure 710.

The filling structure 710 may be coated with a grit material along the inner radial side and outer radial side to increase contact and friction between the filling structure 710 and the sleeve portion 302 at an outer radial side, and the second support portion 706, and the third support portion 708 at the inner radial side. The radial compression at the first force location 900 can thus provide for a relative position to be maintained between the filling structure 710, the sleeve portion 302, the second support portion 706, and the third support portion 708. In an example, due to a compressive force not being applied at a location corresponding to the core portion 102 (e.g., to the right of the first force location 900 in FIG. 12), the second gap 1204 may remain between the filling structure 710 and the sleeve portion 302 even after the compressive force has been applied at the first force location 900.

Figure 13:
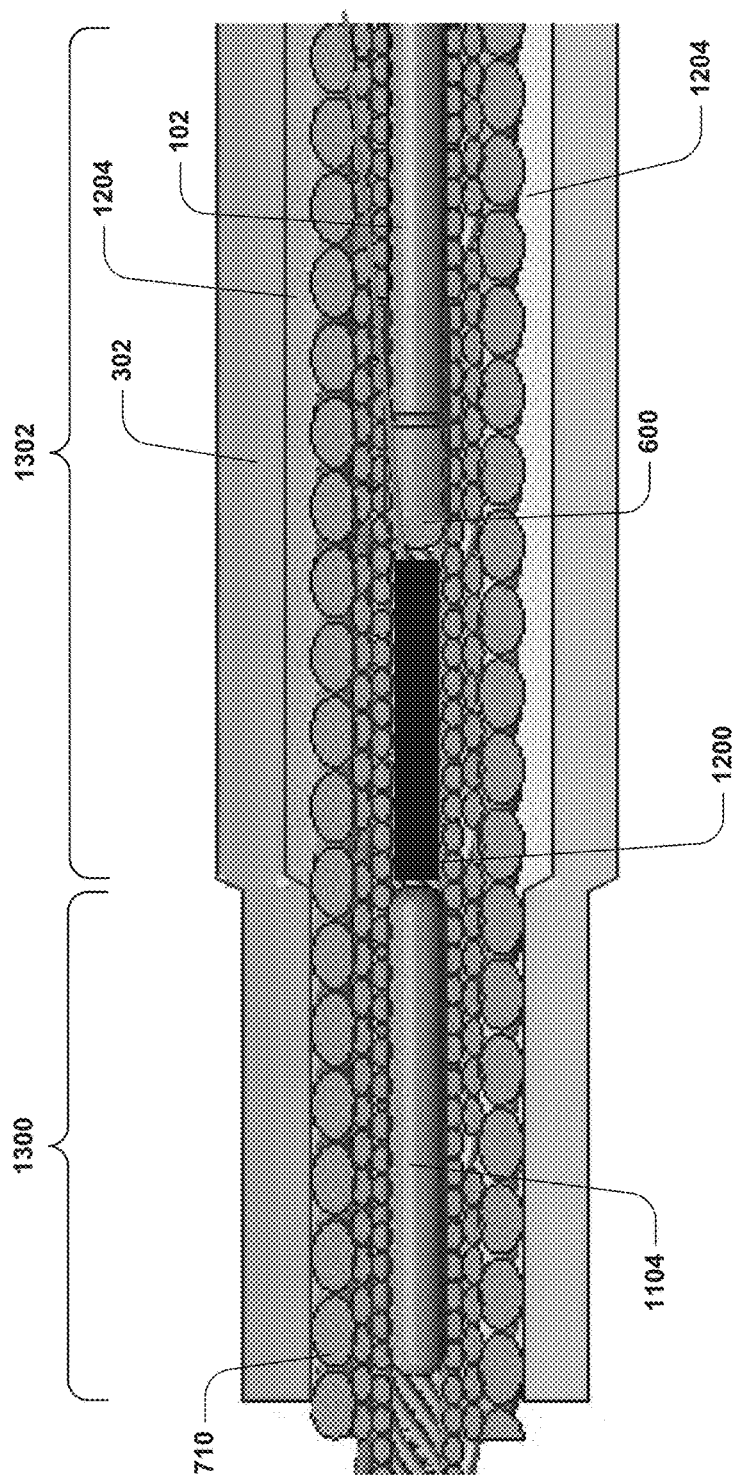
FIG. 13 illustrates a sectional view of a portion of an example dead end structure.

FIG. 13 illustrates the sleeve portion 302 after the radial compressive force has been applied at the first force location 900. In an example, the sleeve portion 302 can comprise a compressed portion 1300 and an uncompressed portion 1302. The compressed portion 1300 can be at the same location as the first force location 900. As a result of the force at the first force location, the sleeve portion 302 can radially compress so as to be reduced in cross-sectional size. As a result of this compression, an inner radial surface of the sleeve portion 302 may contact the filling structure 710. In an example, the first gap 1202 may no longer be present between the sleeve portion 302 and the filling structure 710. However, in an example, the second gap 1204 may remain between the sleeve portion 302 and the filling structure 710 at the uncompressed portion 1302.

The compressed portion 1300 and the uncompressed portion 1302 may have different cross-sectional sizes and shapes. In an example, the uncompressed portion 1302 may have a circular or oval cross-sectional shape. The compressed portion 1300 may have a non-circular and non-oval cross-sectional shape, such as by comprising a polygonal shape. While any number of different types of polygonal shapes are possible, in an example, the compressed portion 1300 may comprise a hexagonal cross-sectional shape. Similarly, in an example, the sleeve portion 302 at the second force location 902 can be compressed in a similar manner as the compressed portion 1300, such that the sleeve portion 302 at the second force location 902 may comprise a polygonal shape, such as a hexagonal cross-sectional shape.

The dead end structure 700 provides a number of benefits in supporting the core portion 102 and the conductor portion 104 of the cable 100. For example, by using both the cable support structure 200 and the cable support structure 702, the dead end structure 700 may be able to support a core having a greater strength than the strength of either of the cable support structures 200, 702 individually. For example, a carbon core may have a strength of about 2400 Mpa, whereas each steel support structure may have a strength of about 1350 MPa. As such, given that the core could support a greater load than a single support structure, using multiple (e.g., two or more) support structures allows the helical support structures to be implemented to support the cable 100.

Additionally, the dead end structure 700, while supporting the cable 100, can limit rotation of the core portion 102 during tension. In such an example, the rotation of the core portion 102 can be limited due, at least in part, to providing two layers of cable support structure: the cable support structure 200 and the cable support structure 702. In such an example, the cable support structure 200 can receive the core portion 102, while the cable support structure 702 can receive the cable support structure 200, thus reducing the likelihood of the core portion 102 from rotating while being supported.

Another benefit is improved sealing of the end 1000 of the core portion 102 to reduce and/or limit water from entering the core portion 102. In such an example, the cap 600 can receive the end 1000 of the core portion 102 and form a seal with the core portion 102, such as with the elastomeric sealing structure 1004 so as to inhibit the ingress of water into the core portion 102. As such, the cap 600, the cable support structure 200 and the cable support structure 702 can function to promote isolation of the radial inner carbon layer of the core portion 102 from water and/or other liquid(s) and/or from contacting metal. The aforementioned design can allow for supporting of the core portion 102 and the conductor portion 104 of the cable 100 with the dead end structure 700, while also providing for electrical current flow between the conductor portion 104 and the jumper line 720 (e.g., through the sleeve portion 302).

Some of the steps of assembling the dead end structure 700 are as follows. First, the cap 600 can be applied to the end 1000 of the core portion 102. Next, the second support portion 210 and the third support portion 220 of the cable support structure 200 can be wound around the core portion 102 to define an inner wound layer. After this, the second support portion 706 and the third support portion 708 can be wound around the second support portion 210 and the third support portion 220 to define an outer wound layer. Next, the filler structure 1104 and/or the spacer structure 1200 can be inserted into the axial support opening 230. Next, the filling structure 710 can be applied to wrap around the second support portion 706 and the third support portion 708. Finally, the filling structure 710 and inner structures can be inserted into the sleeve portion 302 whereupon the sleeve portion 302 can be radially compressed at the first force location 900 and the second force location 902.

In an example, the dead end structure comprises a cap defining an opening, the cap configured to receive an end of the core portion of the cable. In an example, the cap is received within the axial support opening. In an example, the dead end structure comprises an elastomeric sealing structure positioned in contact with and radially between the cap and the core portion. In an example, the cap and the sealing structure form a seal with the core portion. In an example, the dead end structure comprises a filler structure disposed between an end of the core portion and the first support portion. In an example, the filler structure is configured to be received within the axial support opening. In an example, the second support portion and the third support portion are configured to apply a radial compressive force to the filler structure. In an example, the dead end structure comprises a spacer structure positioned between the filler structure on one side and the core portion on an opposing side. In an example, the spacer structure comprises a flexible, elastomeric material.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first cover portion and a second cover portion generally correspond to cover portion A and cover portion B or two different or two identical cover portions or the same cover portion.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A dead end structure for supporting a cable having a core portion comprising:
   a first support portion extending between a first end and a second end, the first support portion defining a support opening through which the first support portion is configured to receive an attachment structure;
   a second support portion attached to the first end of the first support portion, the second support portion having a first helical winding that defines a first axial opening;
   a third support portion attached to the second end of the first support portion, the third support portion having a second helical winding that defines a second axial opening, the first helical winding and the second helical winding configured to engage one another such that the first axial opening and the second axial opening are axially aligned to define an axial support opening into which the core portion of the cable is received, the second support portion and the third support portion configured to apply a radial compressive force to the core portion to maintain a relative position between the core portion and the second support portion and the third support portion;
   a sleeve defining an axial opening that extends between a first sleeve end and a second sleeve end, the second support portion and the third support portion received within the axial opening of the sleeve, the sleeve configured to apply a radial compressive force to the second support portion and the third support portion to maintain a relative position between the second support portion and the third support portion; and
   a filler structure disposed between an end of the core portion and the first support portion.

2. The dead end structure of claim 1, the filler structure configured to be received within the axial support opening.

3. The dead end structure of claim 2, the second support portion and the third support portion configured to apply a radial compressive force to the filler structure.

4. The dead end structure of claim 2, comprising a spacer structure positioned between the filler structure on one side and the core portion on an opposing side.

5. The dead end structure of claim 4, wherein the spacer structure comprises a flexible, elastomeric material.

6. A dead end structure for supporting a cable having a core portion comprising:
   a first support portion extending between a first end and a second end, the first support portion defining a support opening through which the first support portion is configured to receive an attachment structure;
   a second support portion attached to the first end of the first support portion, the second support portion having a first helical winding that defines a first axial opening;
   a third support portion attached to the second end of the first support portion, the third support portion having a second helical winding that defines a second axial opening, the first helical winding and the second helical winding configured to engage one another such that the first axial opening and the second axial opening are axially aligned to define an axial support opening into which the core portion of the cable is received, the second support portion and the third support portion configured to apply a radial compressive force to the core portion to maintain a relative position between the core portion and the second support portion and the third support portion; and
   a filler structure disposed between an end of the core portion and the first support portion, the filler structure configured to be received within the axial support opening, the second support portion and the third support portion configured to apply a radial compressive force to the filler structure.

7. The dead end structure of claim 6, the filler structure having a filler cross-sectional size that substantially matches a core cross-sectional size of the core portion.

8. The dead end structure of claim 7, the filler structure spaced a distance away from the core portion.

9. The dead end structure of claim 6, comprising a cap defining an opening, the cap configured to receive at least one end of the core portion of the cable.

10. The dead end structure of claim 9, wherein the cap is received within the axial support opening.

11. The dead end structure of claim 10, comprising an elastomeric sealing structure positioned in contact with and radially between the cap and the core portion.

12. The dead end structure of claim 11, wherein the cap and the elastomeric sealing structure form a seal with the core portion.

13. The dead end structure of claim 6, comprising a spacer structure positioned between the filler structure on one side and the core portion on an opposing side.

14. The dead end structure of claim 13, wherein the spacer structure comprises a flexible, elastomeric material.

\* \* \* \* \*